Nov. 25, 1941.       H. S. CAMPBELL       2,263,568
AIRCRAFT EQUIPPED WITH ROTATIVE SUSTAINING WINGS
Filed Jan. 24, 1940       2 Sheets-Sheet 2
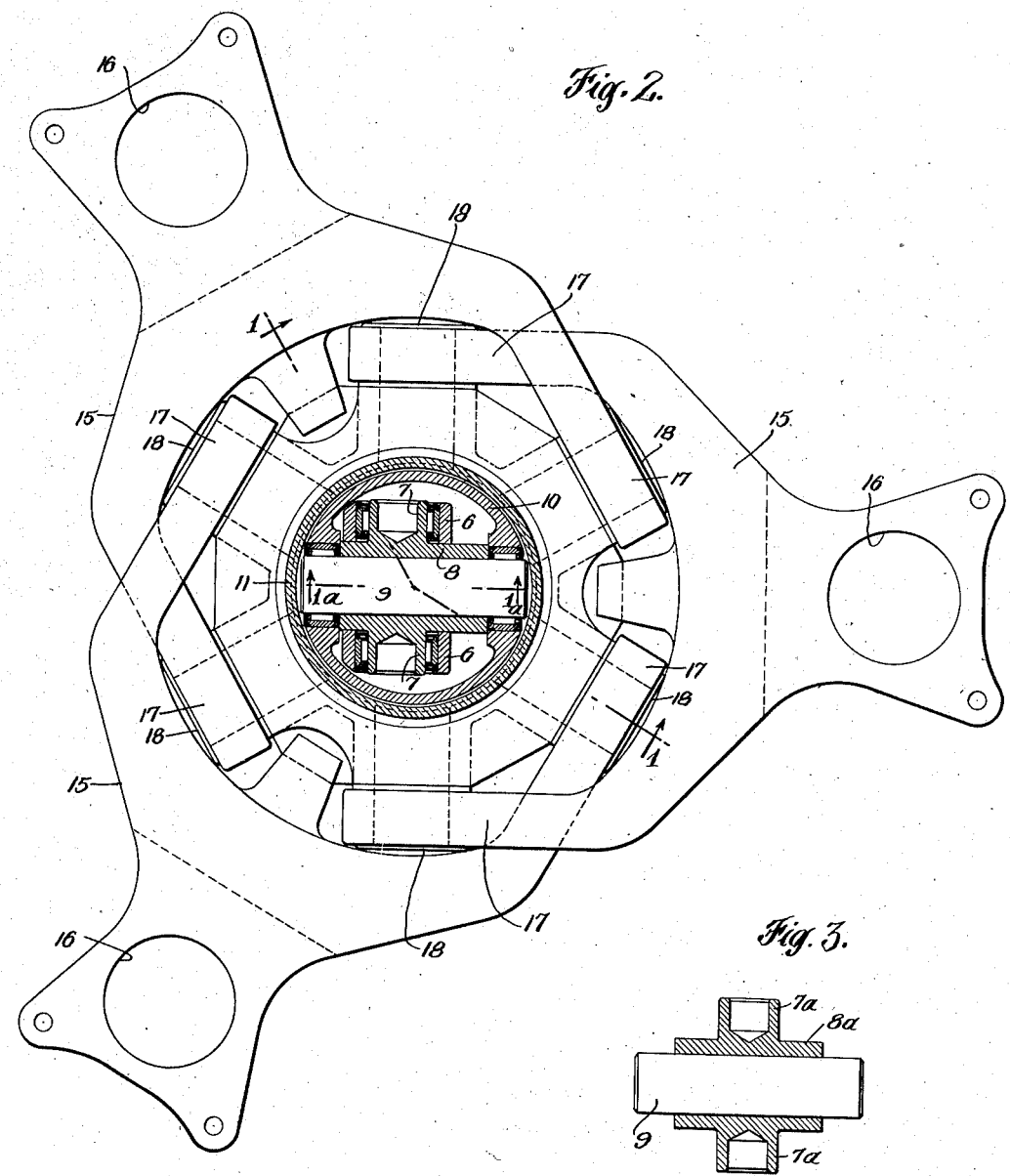

Patented Nov. 25, 1941

2,263,568

UNITED STATES PATENT OFFICE 2,263,568

AIRCRAFT EQUIPPED WITH ROTATIVE SUSTAINING WINGS

Harris S. Campbell, Bryn Athyn, Pa., assignor to Autogiro Company of America, Willow Grove, Pa., a corporation of Delaware Application January 24, 1940, Serial No. 315,310

10 Claims. (Cl. 244—18)

This invention relates to aircraft equipped with rotative sustaining wings or blades, and especially to a rotor hub or rotor head structure. The invention, moreover, is particularly concerned with that type of sustaining rotor in which the hub is mounted for tilting movement in all directions for control or maneuvering of the craft, as disclosed, for example, in copending application of Juan de la Cierva, Serial No. 645,985, filed December 6, 1932.

The invention has in view an improved arrangement of tiltable mounting means such as to provide ease of control, reduction of control loads and reduction of vibrations and the like transmitted from the rotor to the control system.

Other advantages of the invention include improvement in the bearing arrangement; location and interconnection of hub parts in a manner facilitating assembly and separation, especially when removing the rotor; and effective location of a rotor brake and of a rotor drive mechanism, affording improvement both from the standpoint of reduction of overall dimensions of the hub and also from the standpoint of the relationship of these parts to the hub bearings.

How the foregoing and other objects and advantages are attained can best be understood after consideration of the structure itself, as described hereinafter with reference to the accompanying drawings, in which—

Figure 2 is a horizontal sectional view through the hub structure taken as indicated by the section line 2—2 on Figure 1; and Figure 3 is a fragmentary detail view illustrating a modification.

Figure 1:
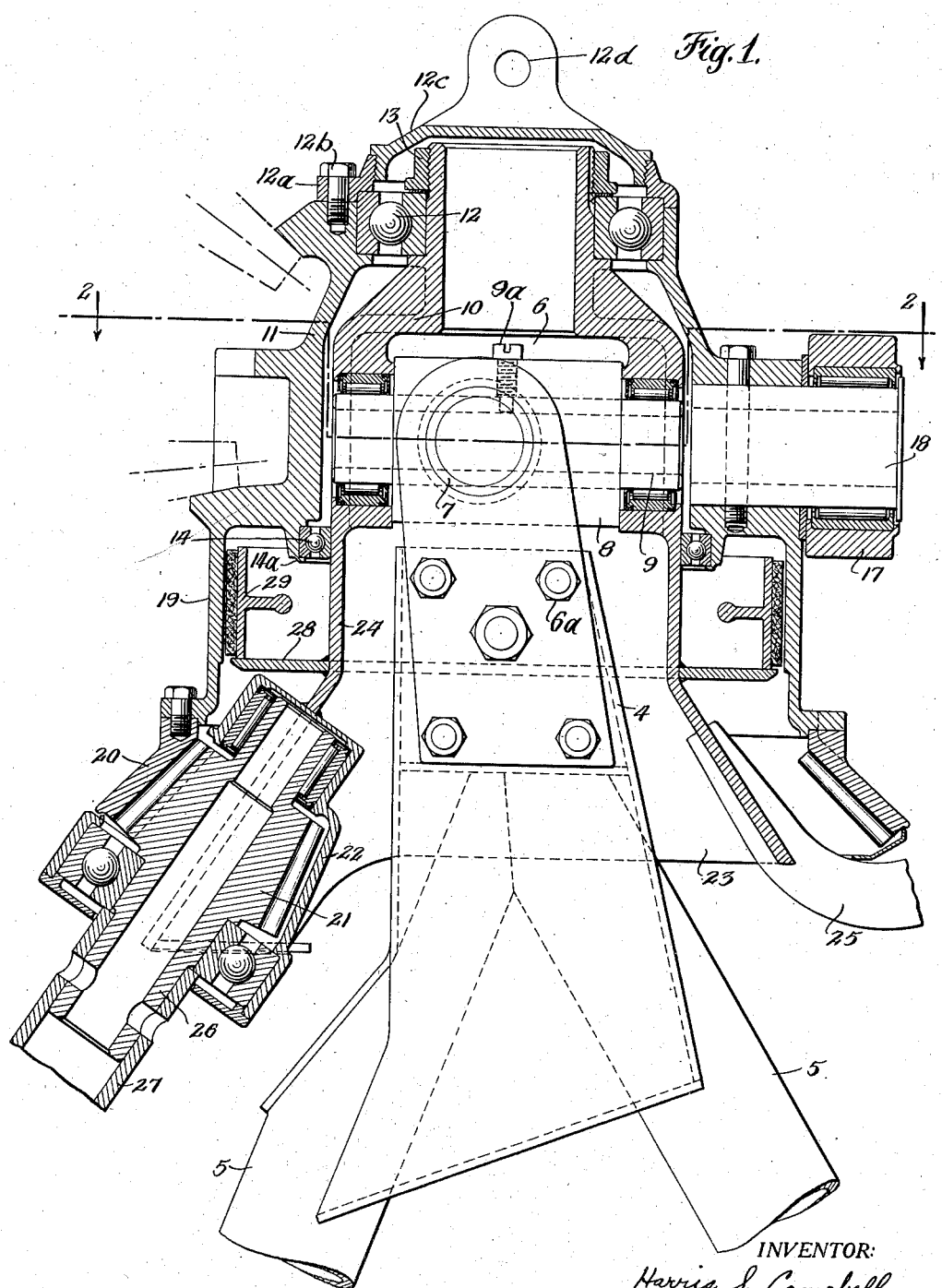
Figure 1 is a vertical sectional view through a rotor hub constructed in accordance with this invention. The showing of the rotative hub part and blade connections in this view is taken on the line 1—1 on Figure 2, and the section of the non-rotative hub part and elements associated therewith is taken substantially as indicated by the section line 1a—1a on Figure 2.

In the drawings, the reference numeral 4 designates a fixed rotor support which may be positioned above the body of the craft as by posts 5—5. This support is provided with a pair of spaced upwardly projecting and apertured lugs 6—6 connected with the support 4 by bolts 6a and serving to journal the trunnions 7—7, which are aligned transversely and which form a tilting axis on which the hub assembly may be tilted fore and aft of the machine. Trunnions 7—7 project from member 8 through which a pivot 9 is insertible, the outer ends of this pivot being journalled in apertures formed in the non-rotative hub part 10; the pivot 9 thereby providing an axis for tilting movement of the hub transversely of the aircraft. Pin 9 is secured in the block 8 by a screw 9a.

The rotative hub member 11 is journalled on the non-rotative part 10 by means of an upper bearing 12 of small race diameter adapted to transmit the thrust of sustention from the rotative hub member to the non-rotative part through the ring 13, which is threaded onto the upper end of part 10. A second, lower, radial bearing 14 of relatively large race diameter is interposed between the two parts of the hub, preferably being free for relative axial adjustment with respect to one of the hub parts so as to be relieved of any thrust load.

The outer race of bearing 12 is secured to the rotative hub member 11 by means of a ring 12a bolted to member 11 as at 12b. Ring 12a is internally threaded to cooperate with the cap 12c having a lifting lug 12d. The outer race of bearing 14 may be secured in place by a lip 14a.

As best seen in Figure 2, the blades are adapted to be connected with the rotative hub member 11 by means of forks 15, one fork being provided for each blade. As shown in Figure 2, the rotor incorporates three blade mounting forks, each of which is apertured at its outer or base end, as indicated at 16, to receive a drag pivot by means of which the blade is connected with the fork. The prongs 17—17 of each blade fork extend to embrace the hub, being connected thereto by pivot parts 18—18 positioned to provide a flapping axis intersecting the rotational axis of the hub. The several blade forks serially overlap around the hub in a manner providing clearance for individual flapping movement of each blade, in the manner described and claimed in my prior Patent No. 2,122,450, issued July 5, 1938.

Referring again to Figure 1, it will be seen that the rotative hub 11 is provided with a downwardly extending cylindrical portion 19 to the lower edge of which a ring gear 20 is connected, serving as a driving element for the rotor. The cooperating driving pinion 21 is journalled in a housing 22 rigidly connected with a flared or conical portion 23 which depends from the non-rotative hub part 10, there being an intervening generally cylindrical portion 24 in the same general horizontal plane as the portion 19 of the rotative hub 11. The conical portion 23 of the non-rotative hub part not only serves to carry the driving pinion 21, but is also employed for attachment of controls to effect tilting of the hub, a portion of a control member being indicated at 25.

With respect to the drive mechanism, it is to be understood that the pinion shaft 26 may be driven by torque tube 27, which latter extends downwardly to the body of the craft for actuation by any suitable source of power, such as a forward propulsion engine (driving an airscrew) with which the machine is preferably equipped. Flexible joints (not shown) are employed in the drive shafting, such as tube 27, in order to accommodate tilting movements of the hub. The drive system may be of any desired type, such as that employed heretofore in aircraft having a normally freely aerodynamically rotated rotor, in which the drive is employed only to start the rotor prior to leaving the ground, a suitable clutch or clutches being interposed to permit disconnection of the drive system, either manually or automatically (as by an overrunning clutch) or both.

An annular plate 28 mounted on the cylindrical part 24 of the non-rotative hub support serves to support brake mechanism including shoes or the equivalent 29 adapted to cooperate with the cylindrical portion 19 of the hub proper. In this way, a braking reaction may be applied between the rotative and non-rotative hub parts in a plane close to the radial bearing 14.

According to the foregoing, provision is made for locating the rotor tilting trunnions in the plane of the articulations by means of which the blades are connected to the hub. This location of the tilting trunnions provides ease of control and reduces transmission of loads and vibrations from the rotor to the control system.

While, as shown in Figures 1 and 2, the tilting axis provided by pivot parts 7—7 (axis for longitudinal tilt of the rotor) is slightly offset forwardly from the axis of rotation of the rotor, if desired this axis may be located on center, as by employing a universal block of the type incorporated in the modified arrangement of Figure 3. Here the block 8a is provided with trunnion parts 7a—7a midway its ends, so that upon substitution of this part for the part 8 of Figure 2, the axis for longitudinal tilt of the rotor is brought to a position intersecting the rotational axis of the hub.

The invention thus provides for the disposition of the tilting trunnions in or substantially in the plane of the blade articulations, and also with their axes intersecting or close to the rotational axis of the hub. Over and above this, the arrangement described makes possible the relative locations of axes just mentioned in a rotor in which the flapping pivot axes for the blades intersect the rotational axis of the hub. Smoothness of operation and ease of control are thereby considerably enhanced.

The manner of assembly of rotor hub parts is also of substantial advantage, especially since separation of the rotor together with the rotative hub part, as a unit, is greatly simplified.

In assembling various of the rotor head parts the universal block 8 is first brought in position over the fixed rotor support 4 and secured in position by applying the apertured lug members 6 to the trunnions 7, the lug members being fastened to the support 4 by bolts 6a. The non-rotative hub support 10 is then brought down over the universal block 8 and pin 9 inserted and secured in place by screw 9a.

Thereafter, the hub member proper 11, with the bearings 12 and 14 secured therein, is applied and secured in position by a single fastening means, i. e., by the ring nut 13 which, in flight, serves to transmit the sustention thrust from the hub 11 to the tiltable hub support 10. Cap 12c may thereafter be applied.

Note especially that the rotor-tilting control connections and the drive mechanism are both so arranged that neither of them need be disturbed or disconnected when removing the rotative hub or the hub and blades as a unit. The arrangement of the main rotor thrust bearing 12 adjacent the top of the hub, together with other features discussed above, makes possible separation of the hub (or hub and blades as a unit) merely by removing the single securing ring 13. Access to this ring is readily attained by removal of the hub cap 12c, which, if desired, may be replaced after separation of ring 13, and its lug 12d then used as a lifting means.

The arrangement of the rotor hub bearings as described above is also of substantial advantage since the lower bearing, which must necessarily be of relatively large diameter (in order to provide space for tilting of the hub with respect to the fixed support) is relieved of all thrust load and may, therefore, be reduced in size or capacity. On the other hand, the location of the thrust bearing above the plane of the blades permits the use of a relatively small diameter bearing in this position and this, in turn, is of advantage in reducing the overhang through which the sustention thrust is transmitted from the rotative hub to the non-rotative support.

I claim:

1. In an aircraft having a bladed sustaining rotor, an external rotative hub member to which the blades of the rotor are pivotally connected, an internal non-rotative hub member, a rotor support projecting upwardly into the non-rotative member and connected therewith by joint means providing freedom for hub tilting, and bearing means interposed between the hub members and including an upper relatively small diameter bearing adapted to transmit the thrust of sustention from the rotative hub member to the non-rotative member, and a lower relatively large diameter radial bearing between said members.

2. In an aircraft having a bladed sustaining rotor, a rotor support, a non-rotative hub member tiltably mounted on said support, a rotative hub member to which the blades of the rotor are pivotally connected, and bearing means interposed between the hub members and including an upper relatively small diameter bearing adapted to transmit the thrust of sustention from the rotative hub member to the non-rotative member, and a lower relatively large diameter radial bearing between said members, the upper bearing being disposed above the plane of pivotal connection of the blades to the rotative hub member and the lower bearing below said plane.

3. In an aircraft having a bladed sustaining rotor, a rotor support, a non-rotative hub member tiltably mounted on said support with freedom for tilting movement about two generally right angular axes whereby the hub member may be tilted in all directions, a rotative hub member to which the blades of the rotor are pivotally connected, the axes of pivotal connection of the blades with the rotative hub member and of pivotal connection of the non-rotative hub member with the support all lying substantially in a common horizontal plane, and bearing means interposed between the hub members and including an upper relatively small diameter bearing adapted to transmit the thrust of sustention from the rotative hub member to the non-rotative member, and a lower relatively large diameter radial bearing between said members, the upper bearing being disposed above the plane of pivotal connection of the blades to the rotative hub member and the lower bearing below said plane.

4. In an aircraft having a bladed sustaining rotor, an external rotative hub member to which the blades are pivotally connected, an internal non-rotative hub member, a rotor support projecting into the internal hub member and pivotally connected therewith, the non-rotative hub member having a downwardly and outwardly flaring portion, and mechanism for driving the rotor including a driving pinion journalled on said flaring portion, and a cooperating driven ring gear mounted on the rotative hub member.

5. An aircraft having a bladed sustaining rotor including cooperating external and internal rotative and non-rotative hub members, the blades of the rotor being pivotally connected to the external hub member, a rotor hub support, and pivot means interconnecting the hub support and the non-rotative hub member and providing freedom for tilting movement of the hub members in all directions for control purposes, the non-rotative hub member having an outwardly and downwardly flaring portion toward its lower end, a control member for tilting the rotor connected with said flaring portion, and mechanism for driving the rotor including a driving pinion journalled on said flaring portion and a cooperating driven ring gear connected with the rotative hub member, whereby the relative position of the driving pinion and driven gear is accurately maintained notwithstanding tilting movements of the hub under the influence of said control member.

6. An aircraft having a bladed sustaining rotor including cooperating external and internal rotative and non-rotative hub members, the blades of the rotor being pivotally connected to the external hub member, a rotor hub support, and pivot means interconnecting the hub support and the non-rotative hub member and providing freedom for tilting movement of the hub members in all directions for control purposes, the non-rotative hub member having an outwardly and downwardly flaring portion toward its lower end, a control member for tilting the rotor connected with said flaring portion, mechanism for driving the rotor including a driving pinion journalled on said flaring portion and a cooperating driven ring gear connected with the rotative hub member, and bearing means between the rotative and non-rotative hub members including an upper relatively small diameter bearing located in a plane above the plane of pivotal connection of the blades to the hub, and a lower relatively large diameter radial bearing located below said plane.

7. An aircraft including a bladed sustaining rotor, and a rotor head structure incorporating cooperating external and internal rotative hub members, the rotor blades being pivotally connected with the external hub member and the internal hub member being pivotally mounted for tilting movement with respect to the body of the aircraft, bearing means between the rotative and non-rotative hub members including a relatively large diameter radial bearing disposed below the plane of attachment of the blades to the rotative hub member, a rotor brake disposed and adapted to react between the hub members in a plane adjacent said bearing, and rotor driving mechanism including a driving gear journalled on the non-rotative hub member and a cooperating driven ring gear connected with the rotative hub member in a plane below the rotor brake.

8. In an aircraft sustaining rotor, an internal non-rotative hub supporting member, an external rotative hub, a thrust bearing between the hub and hub supporting members adjacent the upper ends thereof, driving means for the rotor including a driving pinion mounted on the non-rotative hub support and a cooperating internal ring gear mounted on the rotative hub, and a separable securing element cooperating with said thrust bearing to transmit thrust therefrom to the non-rotative hub support, the rotative hub member being removable from the non-rotative hub supporting member upon separation of said element.

9. In an aircraft sustaining rotor, an internal non-rotative hub supporting member, an external rotative hub, a thrust bearing between the hub and hub supporting members adjacent the upper ends thereof, and a separable securing element cooperating with said thrust bearing to transmit thrust therefrom to the non-rotative hub support, the rotative hub member being removable from the non-rotative hub supporting member upon separation of said element.

10. In an aircraft sustaining rotor, a tiltably mounted internal non-rotative hub supporting member, an external rotative hub, a thrust bearing between the hub and hub supporting members adjacent the upper ends thereof, driving means for the rotor including a driving pinion mounted on the non-rotative hub support and a cooperating internal ring gear mounted on the rotative hub, means for controllably tilting the hub including a connection extended from said non-rotative hub supporting member, and a separable securing element cooperating with said thrust bearing to transmit thrust therefrom to the non-rotative hub support, the rotative hub member being removable from the non-rotative hub supporting member upon separation of said element substantially without disturbing the parts of the driving means or the means for controllably tilting the hub which are connected with the non-rotative hub supporting member.

HARRIS S. CAMPBELL.